(12) United States Patent
Bae (10) Patent No.: US 8,968,202 B2
(45) Date of Patent: Mar. 3, 2015

(54) SYSTEM OF FORMING ULTRASOUND IMAGE AND METHOD OF FORMING SCAN LINE DATA

(75) Inventor: Moo Ho Bae, Seoul (KR)

(73) Assignee: Medison Co., Ltd., Hongchun-gun (KR)

( * ) Notice: Subject to any disclaimer, the term of this patent is extended or adjusted under 35 U.S.C. 154(b) by 1099 days.

(21) Appl. No.: 12/101,643

(22) Filed: Apr. 11, 2008

(65) Prior Publication Data

US 2008/0255454 A1 Oct. 16, 2008

(30) Foreign Application Priority Data

Apr. 13, 2007 (KR) .................. 10-2007-0036226
Apr. 11, 2008 (KR) .................. 10-2008-0033665

(51) Int. Cl.
*A61B 8/00* (2006.01)
*G01S 7/52* (2006.01)

(52) U.S. Cl.
CPC ......... *G01S 7/52034* (2013.01); *G01S 7/52085* (2013.01)
USPC ............................ 600/447; 600/437; 600/443

(58) Field of Classification Search
USPC ......................................... 600/437, 447, 443
See application file for complete search history.

(56) References Cited

U.S. PATENT DOCUMENTS

| | | | |
|---|---|---|---|
| 5,544,655 A * | 8/1996 | Daigle | 600/447 |
| 5,793,701 A * | 8/1998 | Wright et al. | 367/7 |
| 6,231,511 B1 * | 5/2001 | Bae | 600/447 |
| 6,432,056 B1 * | 8/2002 | Cooley et al. | 600/443 |
| 6,695,783 B2 * | 2/2004 | Henderson et al. | 600/443 |
| 2002/0082500 A1 | 6/2002 | Henderson et al. | |
| 2004/0267135 A1 | 12/2004 | Takeuchi | |
| 2008/0009725 A1 * | 1/2008 | Bae et al. | 600/437 |
| 2008/0092660 A1 | 4/2008 | Hunt | |

FOREIGN PATENT DOCUMENTS

| | | |
|---|---|---|
| EP | 1 491 913 A2 | 12/2004 |
| EP | 1 860 459 A1 | 11/2007 |
| JP | 8-289891 A | 11/1996 |
| JP | 11-221214 A | 8/1999 |
| JP | 2002-336249 A | 11/2002 |
| JP | 2004-516123 A | 6/2004 |

(Continued)

OTHER PUBLICATIONS

Japanese Office Action Issued Apr. 2, 2013 in Patent Application No. 2008-104996.

(Continued)

*Primary Examiner* — Katherine Fernandez
(74) *Attorney, Agent, or Firm* — Oblon, McClelland, Maier & Neustadt, L.L.P.

(57) ABSTRACT

There are provided an ultrasound imaging system and a method of forming a plurality of scan lines and frames by using receiving signals provided by transducers in a probe. Main scan lines, which are selected among the scan lines and supplement scan lines determined with the others, are assigned to each scan line data forming unit in the ultrasound imaging system. A partial data of the main scan line and a first supplement data of the supplement scan line are formed with receive data obtained from receive signals from at least one transducer. A second supplement data provided from other scan line data forming units is applied to the partial data of the main scan line to form a scan line data of the main scan line.

8 Claims, 8 Drawing Sheets

(56) References Cited

FOREIGN PATENT DOCUMENTS

| WO | WO 02/052297 A2 | 7/2002 |
| WO | WO 2006/003621 A1 | 1/2006 |

OTHER PUBLICATIONS

The Extended European Search Report issued Mar. 26, 2013, in Application No. / Patent No. 08007201.0-1812 / 1980872.

* cited by examiner

FIG. 8

SYSTEM OF FORMING ULTRASOUND IMAGE AND METHOD OF FORMING SCAN LINE DATA

The present application claims priority from Korean Patent Application Nos. 10-2007-0036226 filed on Apr. 13, 2007 and 10-2008-0033665 filed on Apr. 11, 2008, the entire subject matters of which are incorporated herein by reference.

BACKGROUND OF THE INVENTION

1. Technical Field

The present invention generally relates to ultrasound imaging systems, and more particularly to an ultrasound imaging system and a method of forming a plurality of scan lines and frames by using receiving signals provided by transducers in a probe.

2. Background Art

The ultrasound imaging system shows internal structures of a target object in a non-invasive and non-destructive manner. The ultrasound imaging system includes a probe to transmit and receive ultrasound signals and a beam former. In the probe, transducers are equipped to perform the mutual conversion of ultrasound signals and electric signals. When equipping a plurality of transducers, an outspread of the ultrasound can be prevented more effectively compared to a case of equipping a single transducer. Further, with the plurality of the transducers, the ultrasound signals can be focused and the sensitivity may be improved. The transducers may generate the ultrasound signals one by one. Alternatively, some transducers may generate the ultrasound signals at a time. The ultrasound signals transmitted from the transducers are reflected at a discontinuous surface of acoustic impedance, i.e., at a surface of a reflector in a target. Each transducer converts echo ultrasound signals into the electric signals.

The ultrasound signals must be focused when transmitting and receiving. When transmitting, the transmission order of the transducers may be determined by considering the distance differences between the transducers and the focal point. Thus, the ultrasound signals transmitted from all of the transducers, which contribute to form one scan line, reach the focal point at the same time with the same phase. Accordingly, the focused ultrasound signals (i.e., the summation of ultrasound signals at the focal point) may have the maximum amplitude. The ultrasound echoes reflected from the focal point reach each transducer at different times. Thus, when receiving, time delays are applied to the ultrasound echoes so that the echo ultrasound signals can be seen as those arriving simultaneously at the transducers with the same phase.

A large number of focal points are required to improve the image resolution. However, this causes the degradation of the frame rate since the same procedures should be repeatedly performed as much as the number of focal points for forming an image. A receive dynamic focusing is introduced to solve the problem described above. According to the receive dynamic focusing, the number of focal points are fixed in transmission focusing, whereas the number of focal points are varied in receiving focusing in order to focus more finely. However, the improvement in resolution is also limited due to the fixed number of focal points when transmitting. In U.S. Pat. No. 6,231,511, all the signals obtained by performing transmission focusing on a number of adjacent scan lines are used in the receiving focus. This is to obtain the same effect as the case where focal points exist in all the points on the scan line.

Figure 1:
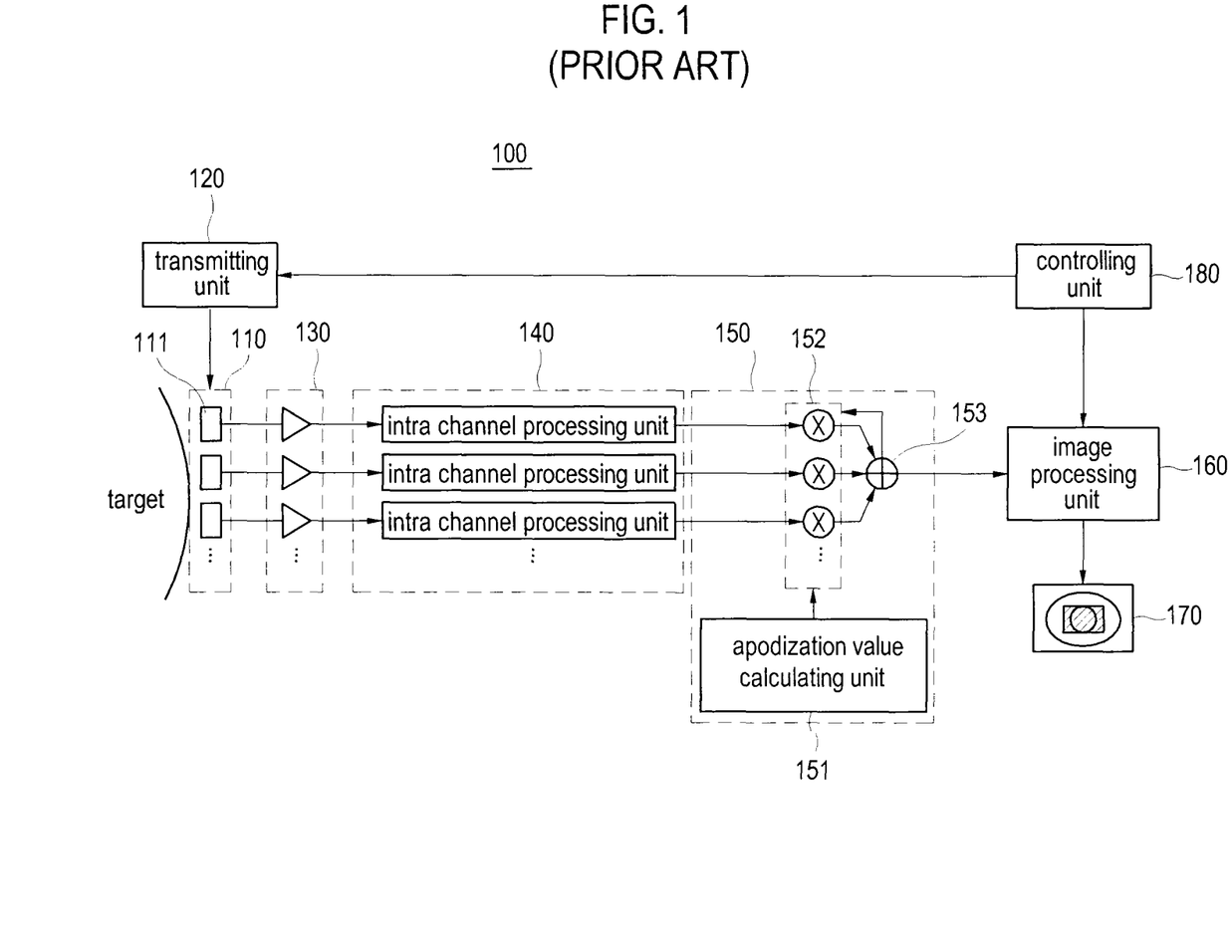
FIG. 1 is a schematic diagram showing a conventional ultrasound imaging system.

Referring to FIG. 1, a conventional ultrasound system generally includes a probe 110, a transmitting unit 120, a receiving unit 130, an intra-channel processing unit 140, a receiving focusing unit 150, an image processing unit 160, a displaying unit 170 and a controlling unit 180. The probe 110 includes a plurality of transducers. The receiving unit 130 and the intra-channel processing unit 140 are equipped and provided as much as the number of transducers.

Figure 2:
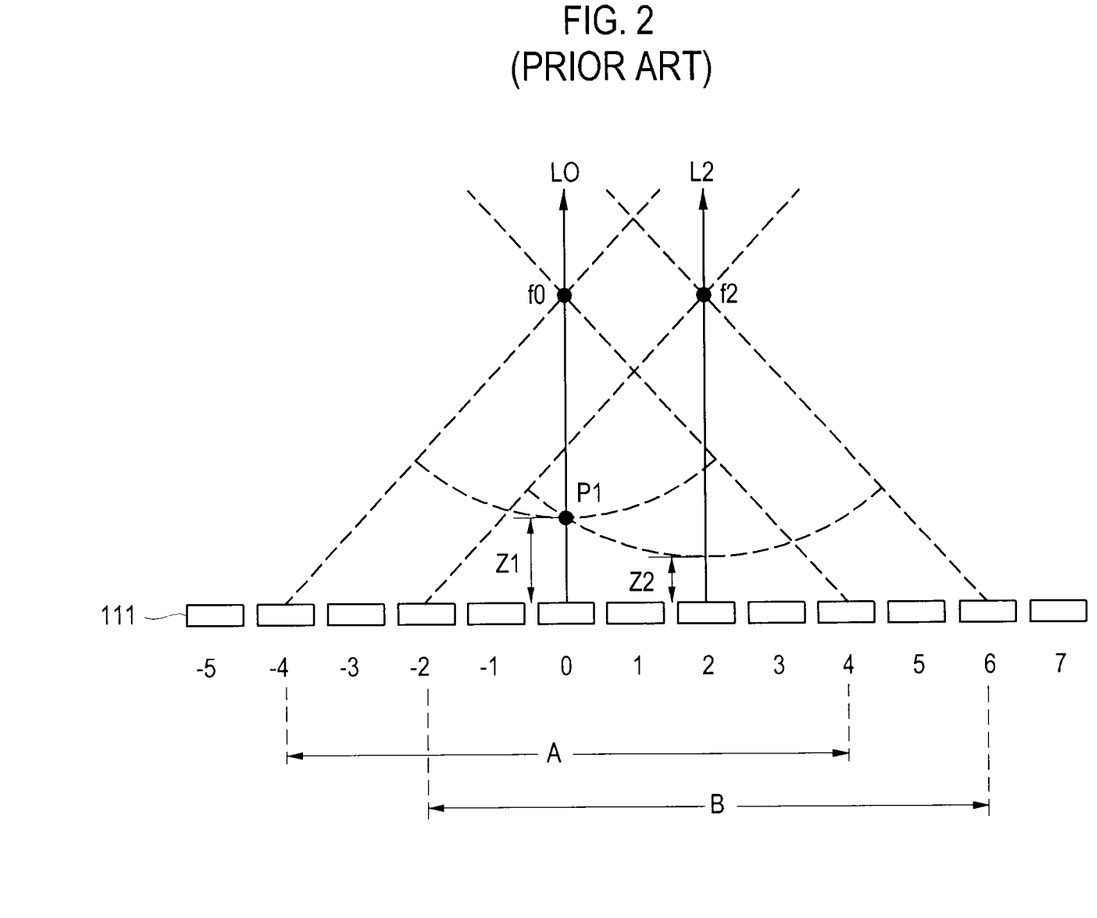
FIG. 2 is a diagram illustrating a conventional method of focusing ultrasound signals.

The transmitting unit 120 generates pulse voltages, which have different time delays, in consideration of the relative positions of the transducers. Each transducer 111 in the probe 110 receives the pulse voltage from the transmitting unit 120 and generates transmitting ultrasound signals. The transmitting ultrasound signals from the transducers are focused on focal points on the transmission scan lines. Referring to FIG. 2, the ultrasound signals generated from the transducers-4 to 4 in section A are focused on a focal point f0 at a scan line L0, while the ultrasound signals generated from the transducers-2 to 6 in section B are focused on a focal point f2 at a scan line L2.

Each transducer receives the ultrasound echoes originated from the ultrasound signals transmitted along the scan lines. For instance, some ultrasound signals transmitted from the transducer 0 along the scan line L0 arrive at a first point P1 when a time corresponding to a path Z1 passes. Then, the ultrasound signals are received at the transducer 0 as the ultrasound echoes when the time corresponding to the path Z1 passes again. Some ultrasound signals transmitted from the transducer 2 along the scan line L2 arrive at the first object point P1 when a time corresponding to a path Z2 passes. Then, the ultrasound signals are received at the transducer 0 as the ultrasound echoes when the time corresponding to the path Z1 passes. That is, the transducer 0 receives the ultrasound echoes, which are originated from the ultrasound signals transmitted along scan lines L0 and L2, respectively.

Referring back to FIG. 1, transducers 111 convert the ultrasound echoes into the electric receiving analog signals. The receiving unit 130 amplifies the electric receiving analog signals and converts the amplified electric receiving analog signals into digital signals. The intra-channel processing unit 140 stores the digital signals of the respective scan lines, delays the digital signals and focuses the delayed digital signals.

Figure 3:
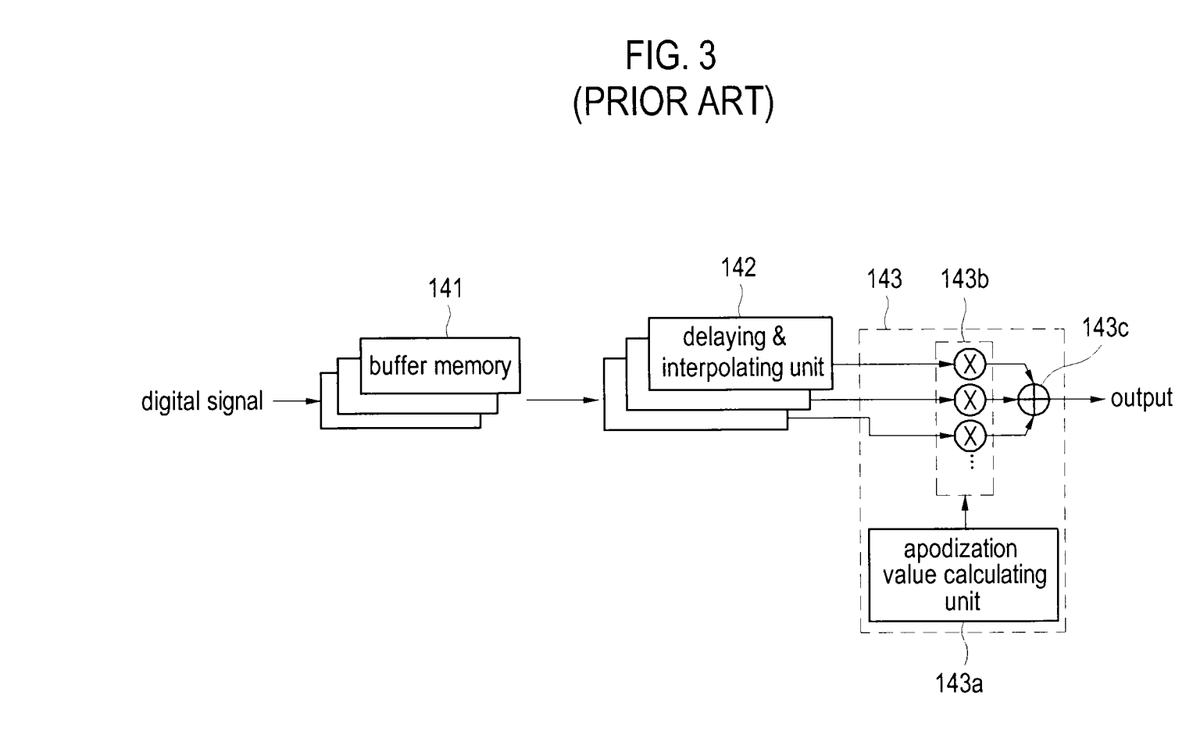
FIG. 3 is a schematic diagram showing components of an intra-channel processing unit in the conventional ultrasound imaging system.

Referring to FIG. 3, the intra-channel processing unit 140 includes buffer memories 141 equipped and provided as much as the number of scan lines, a delaying & interpolating units 142 corresponding to the buffer memories one by one and an apodizing unit 143. Each buffer memory 141 stores the digital signal inputted from the receiving unit 130. For example, the digital signals, which are obtained from the ultrasound echoes received at transducer 0, are separated according to the transmitting scan lines L0 and L2. Thus, the separated digital signals are stored in different buffer memories. The delaying & interpolating unit 142 delays the digital signals by considering the arriving time of ultrasound echoes at each transducer. An apodizing unit 143 includes an intra channel apodization value calculating unit 143a to provide appropriate weight values to the digital signals of each scan line, multiplying units 143b to apply the weight values to the digital signals and an adding unit 143c to sum the outputs from multiplying units 143c.

As shown in FIG. 1, the receiving focusing unit 150 includes an intra-channel apodization value calculating unit 151 to provide appropriate weight values to outputs of the intra channel processing unit 140, i.e., to the digital signals of each transducers, multiplying units 152 to apply the weight values to the digital signals and an adding unit 153 to sum the outputs from multiplying units 152 and to output the focused data of all the transducers 111.

The image processing unit 160 processes the focused data outputted from the receiving focusing unit 150 in various manners. The displaying unit 170 displays ultrasound images with the processed data. The controlling unit 180 controls the operations of transmitting unit 120 and the image processing unit 160.

Each buffer memory 141 of the intra channel processing unit 140 in the conventional ultrasound system described above should have the storage capacity suitable for storing the digital signals per scan line. Generally, the storage capacity should be at least 60 Kbit. Further, the buffer memories 141 are required as much as the scan lines, conventionally over 128. Thus, each intra channel processing unit 140 should have a memory, the storage capacity of which surpasses 7 Mbit.

BRIEF DESCRIPTION OF THE INVENTION

Figure 4:
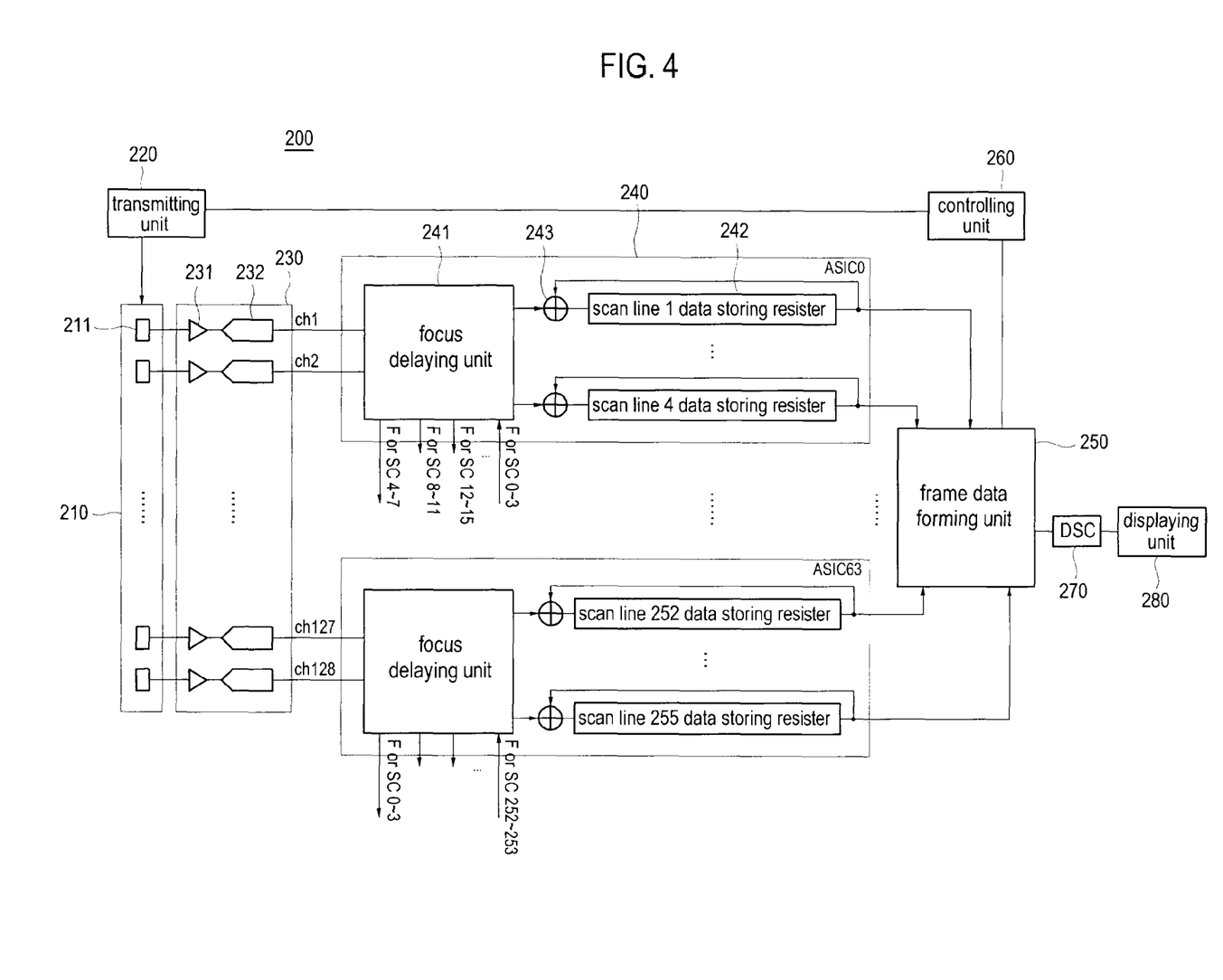
FIG. 4 is a block diagram showing an ultrasound imaging system in accordance with an embodiment of the present invention.
Figure 5:
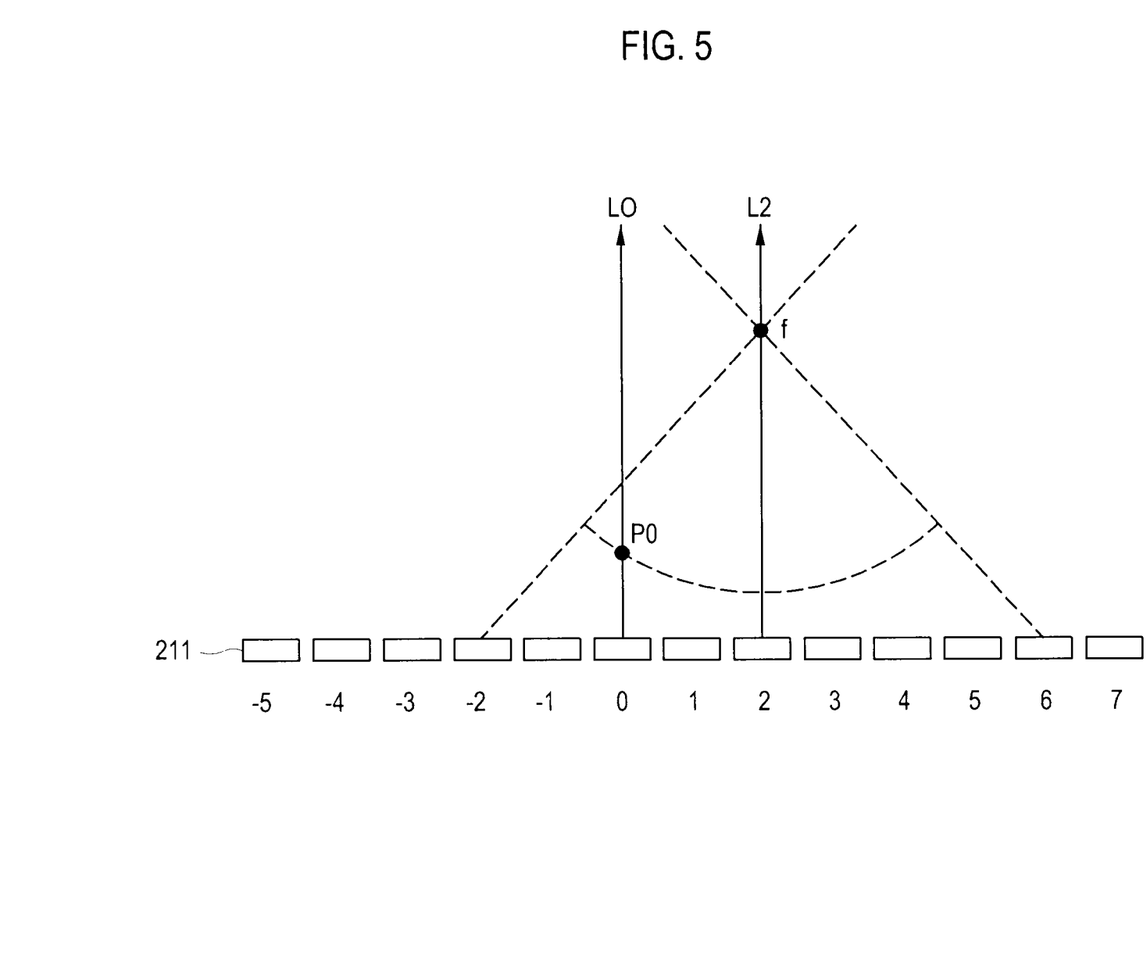
FIG. 5 is a diagram illustrating receiving signals of each transducer of a probe in accordance with an embodiment of the present invention.

An ultrasound imaging system in accordance with the present invention forms scan lines and a frame with receiving signals obtained at each transducer in a probe. Referring to FIG. 4, a probe 210 of an ultrasound imaging system 200 constructed in accordance with the present invention includes a plurality of transducers 211. The receiving signals of each transducer are electric analog signals, which are obtained with echoes of the ultrasound signals transmitted from at least one transducer to different focal points or the same focal point. For example, as shown in FIG. 5, some ultrasound signals transmitted from a transducer 0 to a focal point f on a transmitting scan line 2 are reflected from a point 1 and arrive at the transducer 0 as first receiving ultrasound signals. Another ultrasound signals transmitted from a transducer 2 to the focal point f are reflected from the same point P1 and arrive at the transducer 0 as second receiving ultrasound signals. The receiving signals of the transducer 0 are electric analog signals obtained with the first and second ultrasound signals.

A transmitting unit 220 applies a pulse voltage to each transducer 211. The pulse voltages of the respective transducers have different delay times to which the relative positions of the transducers are reflected.

A receiving unit 230 includes an amplifier 231 to amplify the electric receive signal outputted from the transducers 211 and an analog-digital converter (ADC) 232 to convert the amplified electrical receiving signals into digital signals. Hereinafter, the digital signals outputted from the receiving unit 230 are referred to as receiving data. The amplifier 231 and the ADC 232 are equipped and provided as much as the number of transducers 211.

Scan line data forming units 240 form the data of a plurality of scan lines by using the receiving data. Each scan line data forming unit 240 may be configured with an application-specific integrated circuit (ASIC). At least one main scan lines are assigned to the respective scan line data forming units 240. Each scan line data forming unit has different main scan lines, which are selected among all of the scan lines. The rest of the scan lines are the supplement scan lines of each scan line data forming unit 240. For example, the scan lines 0 to 3, among scan lines 0 to 255, are the main scan lines of the ASIC 0 (i.e., the ASIC 0 is in charge of the scan lines 0 to 3). The rest of the scan lines, i.e., scan lines 4 to 255, are the supplement scan lines of the ASIC 0. The number of main line(s) of each scan line data forming unit 240 may be equal or different. For instance, the same number of scan lines (i.e., four scan lines) may be assigned to the ASICs 0 to 63, or different numbers of main scan lines (e.g., two, three, four main scan lines, etc.) may be assigned to ASICs 0 to 63. The supplement scan lines of one scan line data forming unit may be the main scan lines of other scan line data forming units 240. For example, among the supplement scan lines 4 to 255 of the ASIC 0, the scan lines 4 to 7 are the main scan lines of the ASIC 1, the scan lines 8 to 11 are the main scan line of the ASIC 2, etc. Thus, the scan lines 252 to 255 are the main scan lines of the ASIC 63.

Each scan line data forming unit 240 forms a first supplement data and partial data of each main scan line with the receiving data formed with the receiving signals of the transducer corresponding thereto. As shown in FIG. 4, when forming scan line data of 256 scan lines with 128 transducers and 64 scan line data forming units 240, 4 main scan lines and 252 supplement scan lines are assigned to each scan line data forming unit 240. The scan line data forming unit 240 receives the receiving data provided from the two different ADCs 232 and forms supplement data of the 252 supplement scan lines and the partial data of four main scan lines. Further, each scan line data forming unit forms scan line data of the four main scan lines with the partial data and second supplement data provided from other scan line data forming units. For example, ASIC 0 forms the partial data of main scan lines 0 to 3 with the receiving data obtained from receiving signals from the two transducers corresponding thereto and the supplement data of the supplement scan lines 4 to 255 to be inputted to other scan line data forming units, i.e., ASICs 1 to 63. Also, ASIC 0 forms scan line data of the main scan lines 04 to 3 with the partial data of the main scan lines 0 to 3 and second supplement data inputted from ASICs 1 to 63. Similarly, ASIC 1 forms scan line data of main scan lines 4 to 7 with receiving data obtained from receiving signals from the two transducers corresponding thereto and the supplement data of the main scan lines 4 to 7 inputted from other scan line data forming units, i.e., ASICs 0 and ASIC 2 to 63. Also, ASIC 2 forms supplement data of the supplement scan lines 1 to 3 and scan lines 8 to 255 to be provided to ASICs 0 and 2 to 63.

Referring back to FIG. 4, each scan line data forming unit 240 includes a focus delaying unit 241, a register 242 and an adder 243. The focus delaying unit 241 delays and interpolates the receiving data of the respective scan lines to form the first supplement data and the partial data of the main scan lines. The focus delaying unit 241 applies the second supplement data provided by the other scan line data forming units to the partial data of the main scan lines. The register 242 and the adder 243 play a role of accumulator to accumulate the second supplement data and the partial data of the main scan lines. The output of the register is the scan line data of the main scan lines.

Figure 6:
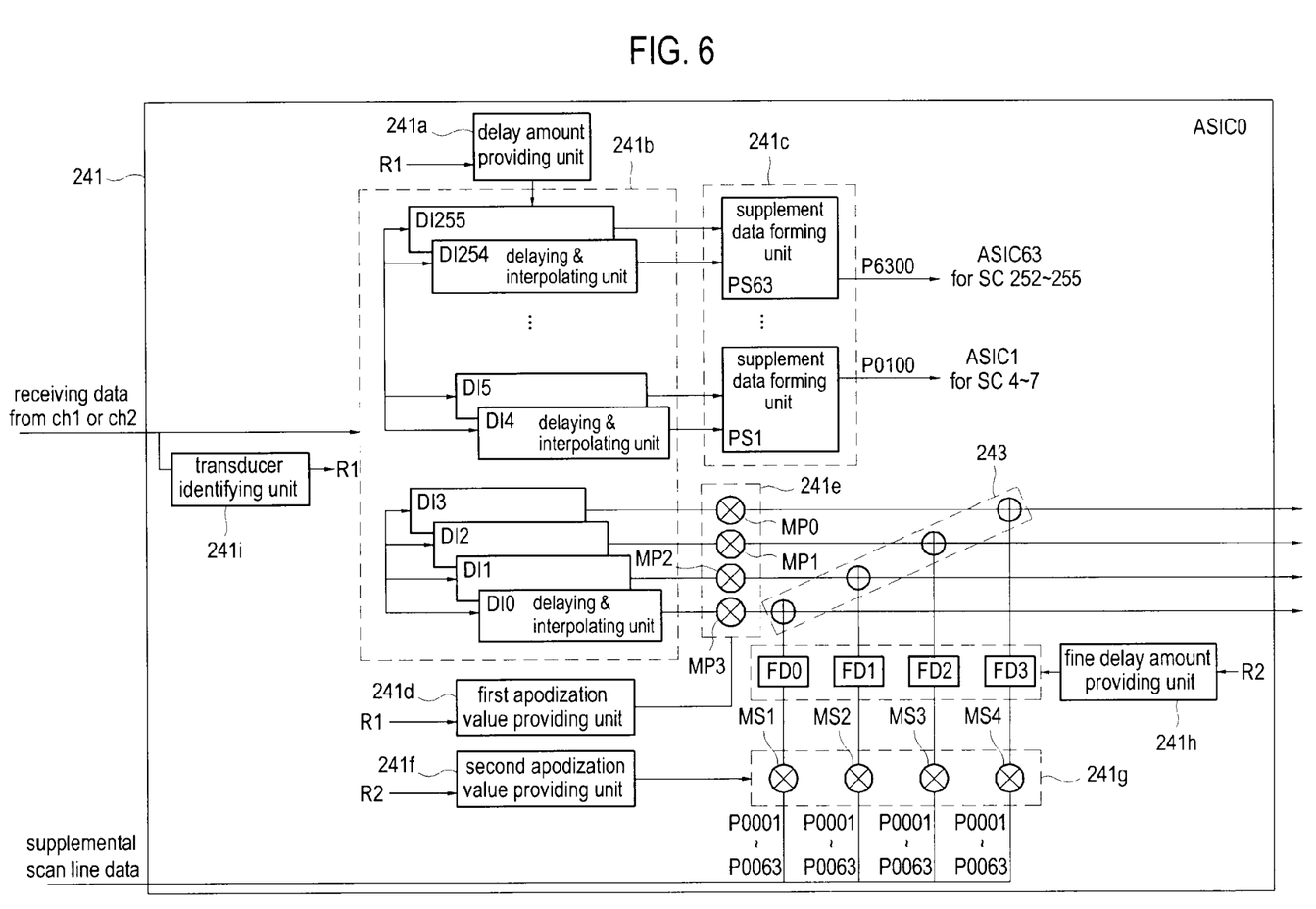
FIG. 6 is a block diagram showing components of a focus delaying unit in accordance with an embodiment of the present invention.
Figure 7:
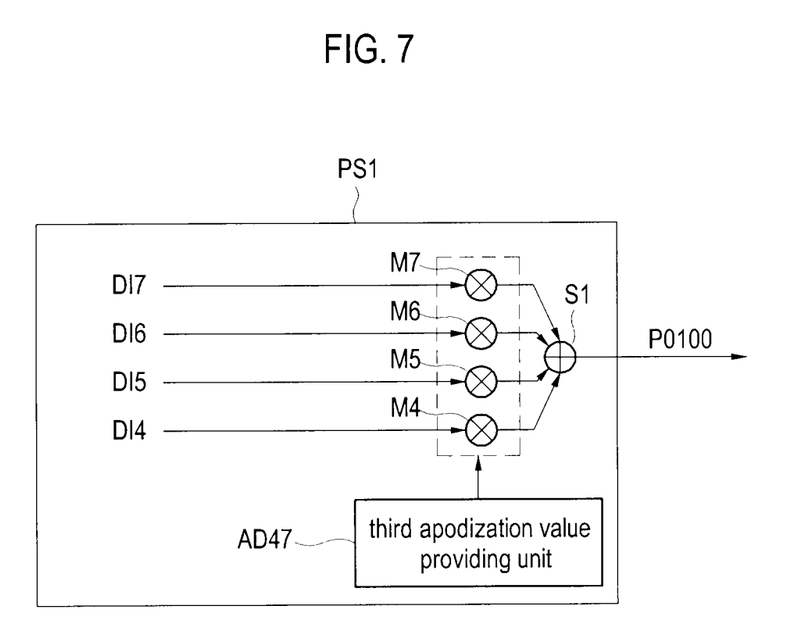
FIG. 7 is a block diagram showing components of a supplement data forming unit in accordance with an embodiment of the present invention.
Figure 8:
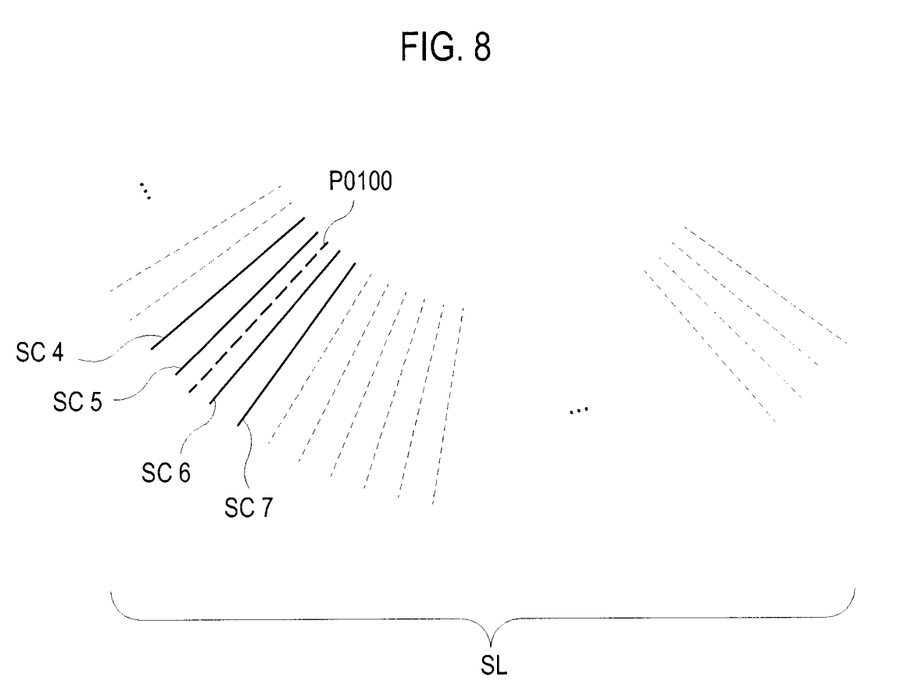
FIG. 8 is a diagram illustrating forming the supplement data in accordance with an embodiment of the present invention.

Referring to FIG. 6, the focus delaying unit 241 includes a focus delay amount providing unit 241*a*, a delaying & interpolating unit 241*b* and a supplement data forming unit 241. The focus delaying unit 241 also includes a first apodization value providing unit 241*d*, a first multiplying unit 241*e*, a second apodization value providing unit 241*f*, a second multiplying unit 241*g* and a transducer identifying unit 241*h*. The transducer identifying unit 241*h* identifies a transducer among the transducers corresponding to each scan line data forming unit 241 and forms transducer information. For example, if the ASIC 0 receives the receiving data obtained with the receiving signals provided from the transducer 0 or 1, then the ASIC 0 identifies which transducer provides the receiving signals between the two transducers 0 and 1 and forms transducer information R1 denoting the identified transducer. The focus delay amount providing unit 241*a* provides the focus delay amount of each scan line in consideration of the transducer information R1. For purposes of simplicity, FIG. 6 schematically shows a single focus delay amount providing unit 241*a*. However, a plurality of focus delay amount providing units is equipped in each scan line data forming as many as the main scan lines. The delaying & interpolating unit 241*b* reflects the focus delay amount to the receiving data in order to delay and interpolate the receive data of the respective scan lines. In the focus delaying unit 241, the delaying & interpolating units 241 are may be equipped and provided as much as the scan lines. For example, when forming the data of 256 scan lines, one focus delay unit 241 includes 256 delay & interpolating units DI0 to DI255, as shown in FIG. 6. The supplement data forming units 241*c* correspond to other scan line data forming units 240. Thus, the number of supplement data forming units is equal to that of the other scan line data forming units. Referring to FIG. 7, a supplement data forming unit PS1 in the ASIC 0 forms supplement data of supplement scan lines SC4 to SC7 to be transmitted to the ASIC 1. A third apodization value providing unit AD47, a plurality of multipliers M4 to M7 and an adder S1 are equipped in the supplement data forming unit PS1. The multipliers M4 to M7 apply the third apodization value to the delayed and interpolated receiving data of the supplement scan lines, wherein the adder S1 sums the outputs from all of the multipliers M4 to M7 to output the supplement data. Referring to FIG. 8, the supplement data forming unit PS1 combines supplement data of the supplement scan lines SC4 to SC 7 to form combined-supplement data P0100. In the "P0100," the former two digits "01" denote the ASIC 01 (ASIC 1) corresponding to the supplement data forming unit PS1, while the latter two digits "00" denote the ASIC 00(ASIC 0) to which the scan line data forming unit PS1 belongs.

Referring once again to FIG. 6, the first apodization value providing unit 214*d* receives the transducer information R from the transducer identifying unit 241*h* and provides the first apodivation values corresponding to the transducer, i.e., identified with the transducer information R, which provides the receiving signals. The first multipliers 242*e*, which are equipped and provided as much as the number of main scan lines, reflect the first apodization value to the partial data of each main scan line. For example, the first apodization value providing unit 241 of ASIC 0 provides the first apodization values of the respective main scan lines 0 to 3, while the first multiplying units 241*e* (i.e., MP0 to MP3) apply the first apodization value to the partial data of the main scan lines 0 to 3 respectively corresponding thereto.

The second apodization value providing unit 241*f* receives the transducer information R2 from the other scan line data forming units to provide the second apodization value. The second multipliers 241*g*, which are equipped and provided as much as the main scan lines, apply the second apodization value to the second supplement scan line data provided from the other scan line data forming units. For example, the second apodization value providing unit 241*f* in ASIC 0 provides the second apodization values, while the second multipliers 241*g* (i.e., M1 to M2), which are equipped and provided as much as the main scan lines of ASIC 0, apply the second apodization value to the second supplement data provided from ASICs 1 to 63.

The outputs of the focus delaying unit, i.e., the partial data and the supplement data of the main scan lines, are accumulated with the register 242 and the adder 243. The final stored valued in the register 242 are outputted as the scan line data of the main scan lines.

The supplement data provided from the other scan line data forming units are obtained from the receiving signals of different transducers. In order to compensate the difference of the transducers, the focus delay unit 241 may further include a fine delay amount providing unit 241*i* and fine delaying units FD0 to FD3. The fine delay amount providing unit 241*i* receives the transducer information R2 and provides a fine delay amount corresponding to the transducers. The fine delaying units FD0 to FD3 finely delays the supplement data, to which the second apodization values are applied.

Referring back to FIG. 4, the frame data forming unit 250 forms frame data with the scan line data provided from all the scan line data forming units 240. A controlling unit 260 controls the input and output of signals of the transmitting unit 220 and the frame data forming unit 250. A digital scan converter 270 of the ultrasound imaging system 220 converts the frame data outputted from the frame data forming unit 250. The displaying unit 280 displays the ultrasound image with the scan converted frame data.

In accordance with a method of forming scan line data with a plurality of scan line data forming units in an ultrasound imaging system, a partial data of the main scan line and a first supplement data of the supplement scan line are formed with receive data obtained from receive signals from at least one transducer. The receiving signals of the transducer include first ultrasound echoes obtained with ultrasound signals transmitted from the transducer and second ultrasound echoes obtained with ultrasound signals transmitted from the other transducers. A second supplement data provided from other scan line data forming units is applied to the partial data of the main scan line to form a scan line data of the main scan line. The second supplement data and the partial data are accumulated to form the scan line data of the main scan line.

In accordance with the present invention, each scan line data forming unit forms the scan line data of the main scan lines and the supplement scan line data. Thus, the required storage capacity may be reduced. Further, the supplement data from another scan line data forming unit are provided in a combined form. As such, the data transmission amount between the scan line data forming units may be decreased.

Any reference in this specification to "one embodiment," "an embodiment," "example embodiment," etc. means that a particular feature, structure or characteristic described in connection with the embodiment is included in at least one embodiment of the present invention. The appearances of such phrases in various places in the specification are not necessarily all referring to the same embodiment. Further, when a particular feature, structure or characteristic is described in connection with any embodiment, it is submitted that it is within the purview of one skilled in the art to effect such feature, structure or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An ultrasound imaging system for forming scan line data and frames, comprising:
    a probe including transducers configured to provide analog receiving signals corresponding to a plurality of scan lines;
    a receiver configured to convert the analog receiving signals into digital signals and to provide receiving data;
    a plurality of scan line data forming circuits,
        wherein a first scan line data forming circuit among the plurality of scan line data forming circuits is configured to assign a portion of the scan lines as main scan lines and the rest of the scan lines as supplement scan lines among the plurality of scan lines, and
        wherein the first scan line data forming circuit
            forms first supplement data corresponding to the supplement scan lines based on the receiving data,
            provides the first supplement data to other scan line data forming circuits among the plurality of scan line data forming circuits,
            receives second supplement data corresponding to the main scan lines from the other scan line data forming circuits, and
            forms scan line data corresponding to the main scan lines by using the second supplement data and the receiving data; and
    a frame data forming circuit configured to receive the scan line data from all of the scan line data forming circuits and to form frame data,
    wherein the first scan line data forming circuit does not provide the second supplement data to the other scan line data forming circuits.

2. The ultrasound imaging system of claim 1, wherein the first scan line data forming circuit includes:
    a focus delayer configured to focus and delay the receiving data of the respective scan lines and to form the first supplement data; and
    an accumulator configured to accumulate the second supplement data corresponding to the main scan lines and the receiving data of the main scan lines to form the scan line data of the main scan lines.

3. The ultrasound imaging system of claim 2, wherein the focus delayer includes:
    a transducer identifier configured to identify a transducer providing the receiving signals and to form first transducer information;
    a focus delay amount provider configured to receive the first transducer information and to provide focus delay amount corresponding to the transducer providing the receiving signals;
    a delaying and interpolating device configured to receive the focus delay amount and to delay and interpolate the receiving data of the respective scan lines;
    a first apodization value provider configured to receive the first transducer information and to provide a first apodization value corresponding to the transducer providing the receiving signals;
    a first multiplier configured to apply the first apodization value to the receiving data of the main scan lines;
    a plurality of supplement data forming circuits corresponding to the other scan line data forming circuits;
    a second apodization value provider configured to receive second transducer information from said scan line data forming circuits and to provide a second apodization value in consideration of the second transducer information; and
    a second multiplier configured to apply the second apodization value to the supplement data.

4. The ultrasound imaging system of claim 3, wherein each of the supplement data forming circuits includes:
    a third apodization value provider;
    a third multiplier configured to apply the third apodization value to the receiving data of the supplement scan lines; and
    an adder configured to sum output from the third multiplier and to form the supplement data.

5. The ultrasound imaging system of claim 2, wherein the focus delayer further includes:
    a fine delay amount provider configured to receive second transducer information and to provide a fine delay amount of the second supplement data in consideration of the second transducer information.

6. The ultrasound imaging system of claim 1, wherein the receiving signals include first ultrasound echoes obtained with the ultrasound signals transmitted from the transducers themselves and second ultrasound echoes obtained with ultrasound signals transmitted from other transducers.

7. A method of forming scan line data with a plurality of scan line data forming circuits in an ultrasound imaging system, the method comprising:
    assigning a portion of a plurality of scan lines as main scan lines and the rest of the plurality of scan lines as supplement scan lines to a first scan line data forming circuit among the plurality of scan line data forming circuits;
    forming first supplement data corresponding to the supplement scan lines based on receiving data,
    providing the first supplement data to other scan line data forming circuits among the plurality of scan line data forming circuits,
    receiving second supplement data corresponding to the main scan lines from the other scan line data forming circuits, and
    forming scan line data corresponding to the main scan lines by using the second supplement data and the receiving data;
    receiving the scan line data from all of the scan line data forming circuits to form frame data,
    wherein the first scan line data forming circuit does not provide the second supplement data to the other scan line data forming circuits.

8. The method of claim 7, wherein the receiving data is formed from first ultrasound echoes obtained with ultrasound signals transmitted from transducers themselves and second ultrasound echoes obtained with ultrasound signals transmitted from other transducers.

* * * * *